(12) United States Patent
Duvekot et al.

(10) Patent No.: US 7,218,649 B2
(45) Date of Patent: May 15, 2007

(54) LASER BEAM CONTAINMENT SYSTEM

(75) Inventors: Loren Duvekot, Goochland, VA (US); Marc D. Belcastro, Glen Allen, VA (US)

(73) Assignee: Philip Morris USA Inc., Richmond, VA (US)

( * ) Notice: Subject to any disclaimer, the term of this patent is extended or adjusted under 35 U.S.C. 154(b) by 265 days.

(21) Appl. No.: 10/649,788

(22) Filed: Aug. 28, 2003

(65) Prior Publication Data

US 2005/0047450 A1    Mar. 3, 2005

(51) Int. Cl.
  *H01S 3/10* (2006.01)
(52) U.S. Cl. ............................................. 372/9; 372/99
(58) Field of Classification Search .................... 372/9, 372/99; 219/121.6, 121.78, 121.79
See application file for complete search history.

(56) References Cited

U.S. PATENT DOCUMENTS

| | | | |
|---|---|---|---|
| 3,913,582 A * | 10/1975 | Sharon | 606/19 |
| 4,473,074 A * | 9/1984 | Vassiliadis | 606/19 |
| 4,623,229 A | 11/1986 | Galan | |
| 4,698,479 A | 10/1987 | Rando et al. | |
| 4,707,585 A * | 11/1987 | Monteith et al. | 219/121.79 |
| 4,892,992 A | 1/1990 | Akeel et al. | |
| 4,976,528 A | 12/1990 | Cuda | |
| 5,000,553 A | 3/1991 | Clementi et al. | |
| 5,034,618 A | 7/1991 | Akeel et al. | |
| 5,038,015 A * | 8/1991 | Einav et al. | 219/121.78 |
| 5,140,129 A * | 8/1992 | Torii et al. | 219/121.78 |
| 5,233,202 A * | 8/1993 | Torii et al. | 250/559.3 |
| 5,308,951 A * | 5/1994 | Mori | 219/121.84 |
| 5,484,982 A * | 1/1996 | Nihei et al. | 219/121.79 |
| 5,864,113 A * | 1/1999 | Cossi | 219/121.67 |
| 6,026,112 A * | 2/2000 | Hecht et al. | 372/99 |
| 6,373,646 B1 * | 4/2002 | Timmermans | 359/896 |
| 6,881,925 B1 * | 4/2005 | Sato et al. | 219/121.73 |
| 2004/0208212 A1 * | 10/2004 | Denney et al. | 372/38.02 |

* cited by examiner

*Primary Examiner*—Minsun Oh Harvey
*Assistant Examiner*—Delma R. Flores Ruiz
(74) *Attorney, Agent, or Firm*—Buchanan Ingersoll & Rooney PC

(57) ABSTRACT

A laser beam containment system includes a number of optics that direct a laser beam produced by a laser beam source along a path to a point of application of the laser beam. One or more hollow tubes are positioned in an arrangement such that the laser beam passes through the hollow tubes. The hollow tubes are also adjustably positioned relative to the laser beam objects to allow for access to the optics for maintenance and adjustment of the optics. Locking mechanisms provide control of the adjustment features of the containment tubes.

10 Claims, 3 Drawing Sheets

LASER BEAM CONTAINMENT SYSTEM

BACKGROUND

High energy laser radiation is used in various manufacturing operations such as perforation of cigarette paper used in the manufacture of cigarettes. During manufacturing operations using a laser beam, the beam is generally directed along a path to a point of application, where the beam's energy can be focused and used to perform an operation on a workpiece such as producing a hole through cigarette paper. Various optics are used to direct and control the laser beam such that the desired results are achieved. Such optics can include bending mirrors, shutter assemblies, beam expanders and beam contractors, rotating, multi-faceted mirrors capable of dividing the laser beam into multiple output laser beams and scanning the output laser beams across a desired arc, collimating lenses and focusing lenses.

A laser beam having sufficient energy to perform a manufacturing operation such as perforation of cigarette paper has the potential to present a hazard to an operator if the operator comes into contact with the laser beam somewhere along its path from the laser beam source to its point of application. For example, maintenance and adjustment of the optics used to direct and control the laser beam could result in an operator coming into contact with the laser beam along its path.

SUMMARY

In an arrangement according to one embodiment, a laser beam containment system protects a user from unauthorized or unintentional exposure to the laser radiation. A laser beam containment system according to one embodiment includes a plurality of optics, including but not limited to flat mirrors, that direct a laser beam produced by a laser beam source along a path to a point of application of the laser beam. One or more hollow tubes are positioned in an arrangement wherein the laser beam passes through the hollow tubes. At least one of the hollow tubes is adjustably positioned relative to at least one of the optics to allow for access to the optic for at least one of maintenance and adjustment of the optic.

BRIEF DESCRIPTION OF THE DRAWING FIGURES

DETAILED DESCRIPTION

Figure 1:
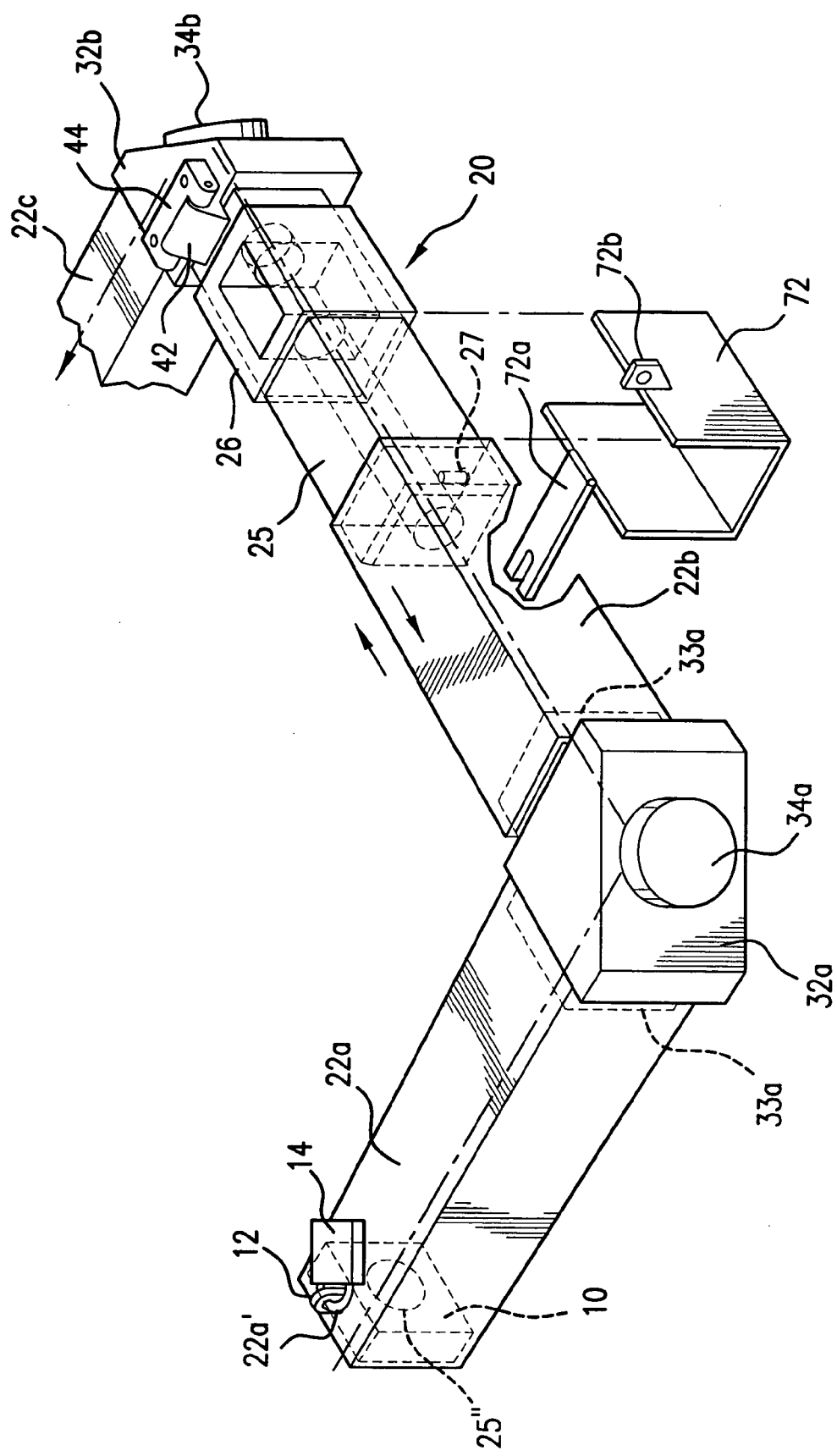
FIG. 1 illustrates an arrangement of hollow laser beam containment tubes according to an embodiment.

Referring initially to FIG. 1, an arrangement for a laser beam containment system according to an embodiment includes hollow containment tubes 22a, 22b and 22c, laser beam bending blocks 32a and 32b containing mirrors 34a and 34b, and a pivotally mounted target block assembly 20 that is pivotally mounted to laser beam bending block 32b.

While tubes having a square cross-section are shown in the drawings, the tubes can have any desired configuration such as round, rectangular, etc.

As shown in FIG. 1, a first end of the hollow tube 22a fits over a flange 10 protruding from an output port on a laser generating device, such as a PRC 3000 watt dual beam GE mode laser (shown in FIG. 4), manufactured by PRC Corporation, Landing, N.J. The end of the hollow tube 22a that fits over the flange 10 can be retained in position relative to the flange through the use of a slot 22a' in the hollow tube 22a and a clasp 12 extending from the flange 10, which can be mated and held in position relative to each other using a padlock 14. As shown in FIG. 1, the opposite end of the hollow tube 22a fits over a flange 33a of the laser beam bending block 32a, which houses bending mirror 34a.

Figure 4:
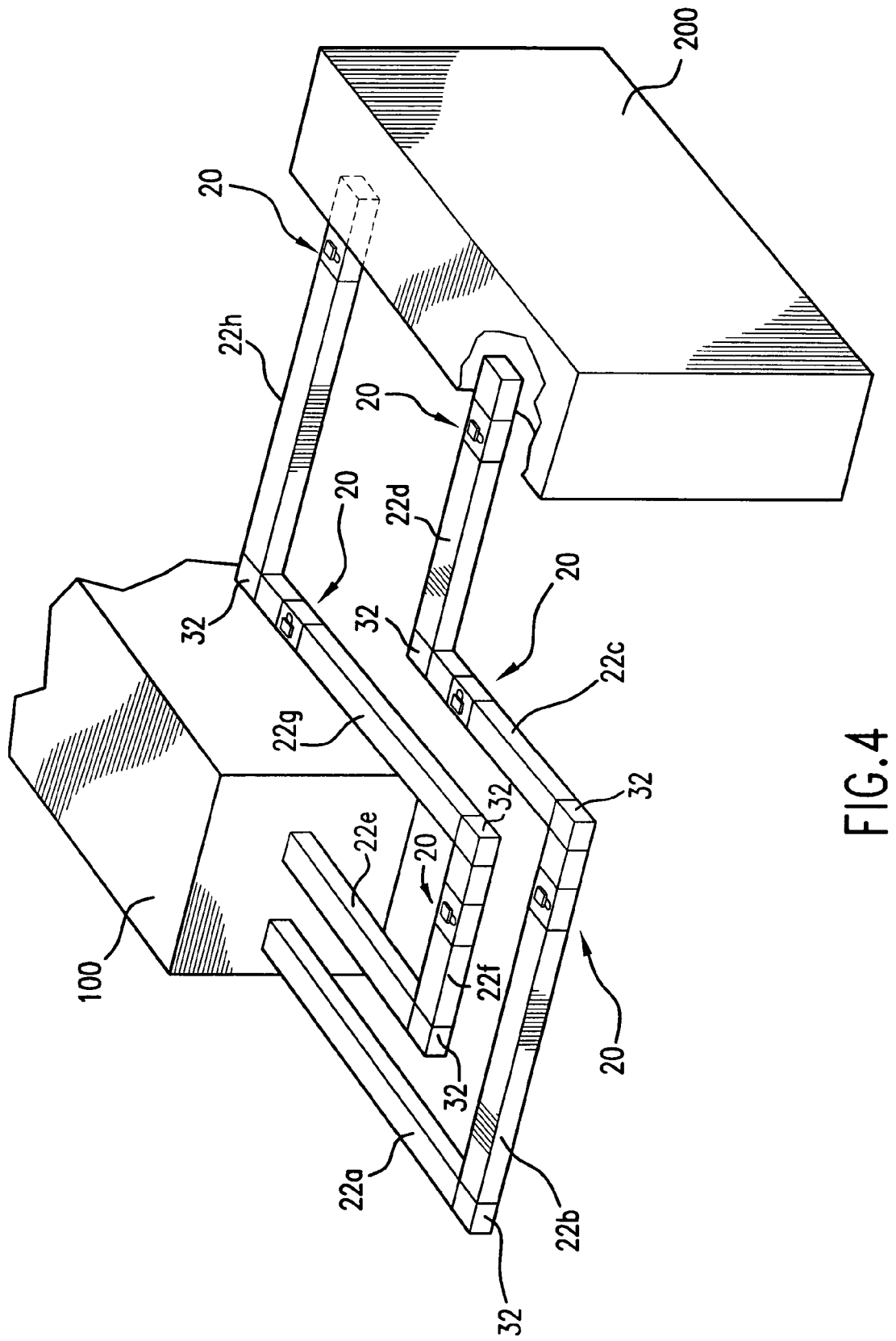
FIG. 4 illustrates an arrangement of hollow laser beam containment tubes and laser beam optics defining two paths for laser beams being emitted from a laser beam source.

A laser beam emitted from the laser source 100, shown in FIG. 4, travels through the hollow tube 22a and is reflected off of the bending mirror 34a within the housing or bending block 32a. A further hollow tube 22b slides over flange 33a of the bending block 32a on a side of the bending block 32a that is orthogonal to the side receiving the incoming laser beam, or at another angle to the side receiving the incoming laser beam depending on the arrangement and particular type of optic mounted within the bending block. As shown in FIG. 1, the opposite end of the hollow tube 22b from the end that fits over the flange 33a of bending block 32a, fits over another hollow tube portion formed from a solid bar 25 having a longitudinal laser beam passage 25" bored through the center. The laser beam reflected from bending mirror 34a within laser beam bending block 32a travels through the hollow tube 22b and through the passage 25".

Figure 2:
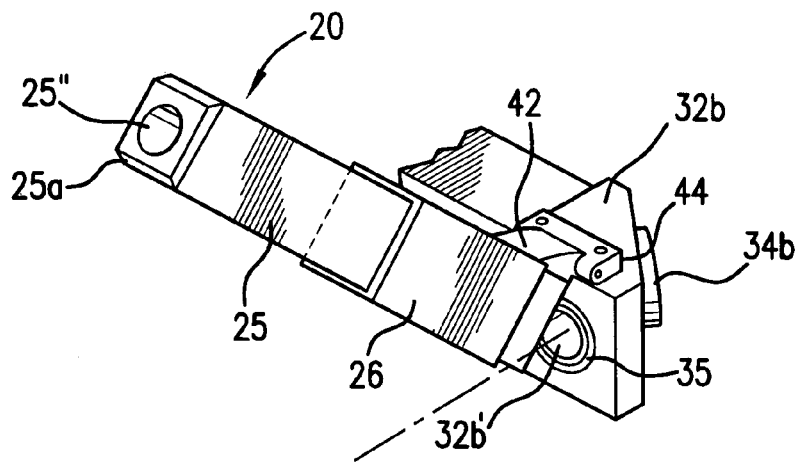
FIG. 2 illustrates a portion of one of the hollow tubes from FIG. 1 adjustably positioned to allow access to a laser mirror.

As best seen in FIG. 2, the end of bar 25 opposite from the end 25a that fits within hollow tube 22b, is pivotally mounted by a hinged mechanism 42, 44 to another laser beam bending block 32b containing a bending mirror 34b. The pivotal mounting of the bar 25 allows the assembly 20 to be pivoted from a position wherein the central longitudinal passage 25" is aligned with an opening 32b' and bending mirror 34b within laser beam bending block 32b, to a position where the bar 25 is moved away from the opening 32b' to allow for access to the bending mirror 34b. As further shown in FIG. 2, the opening 32b' in bending block 32b is provided with an O-ring dust seal 35 that seals against the end face of the end 25b of the bar 25.

As shown in FIG. 2, the assembly 20 also includes a sleeve 26 that is slidably mounted on the bar 25 and adapted to be moved from the one end 25b (shown in FIG. 3) of the bar 25 toward and away from the opposite end 25a of the bar 25. A transverse passageway 25', shown in FIG. 3, extends through the end 25b of bar 25 and intersects the longitudinal passageway 25" through the bar 25. The transverse passageway 25' is adapted to receive a target block 52 that is used for alignment of the laser beam passing between bending mirror 34a and bending mirror 34b and through the hollow tube 22b and the longitudinal passageway 25" of bar 25.

Figure 3:
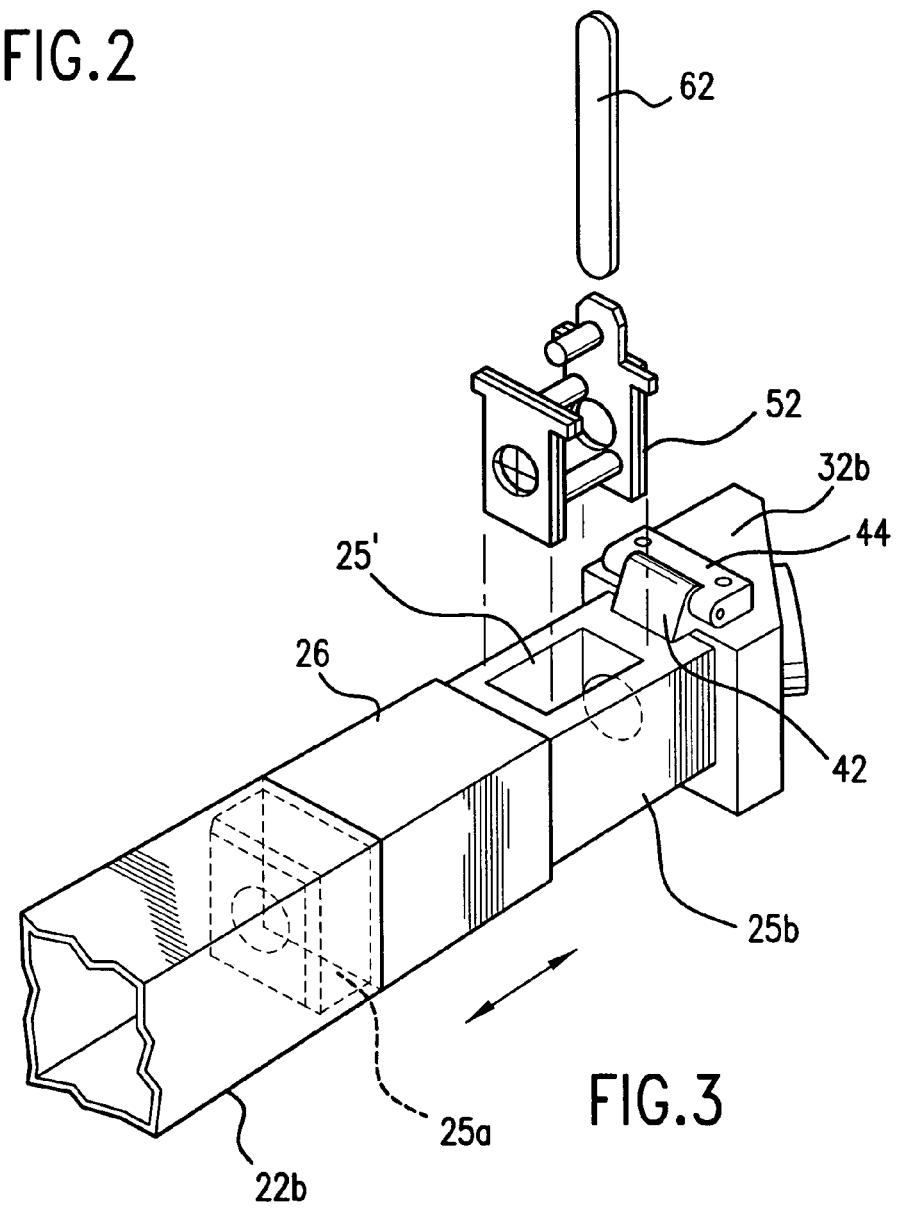
FIG. 3 illustrates a portion of a hollow tube from the arrangement shown in FIG. 1, and illustrates the positioning of a laser beam alignment device within the hollow tube.

As shown in FIG. 3, an alignment procedure for aligning the laser beam passing between bending mirrors 34a and 34b can be performed by sliding the sleeve 26 from the end 25b of bar 25 toward the end 25a of bar 25 in order to uncover the transverse passageway 25'. A target block 52 can then be lowered into the transverse passageway 25' during the alignment procedure. A marking device such as a wood tongue depressor 62 is then positioned relative to the target block 52, and the laser beam turned on for a short time with the result that cross-hairs formed by the target block 52 are burned into the wood marking device 62. This enables an operator to make adjustments to ensure that the laser beam traveling from bending mirror 34a to bending mirror 34b is properly positioned relative to the containment tube 22b and pivotable assembly 20.

During normal operation when neither maintenance nor alignment of the laser beam are being performed, the hollow tube 22b and bar 25 can be retained in position by installing a locking sleeve or shield 72 on the outside of bar 25 between an end of the slidable sleeve 26 and the end of the hollow tube 22b, as shown in FIG. 1. The locking sleeve 72 can be retained in position through the use of a latch assembly 72a, 72b, thus preventing the sliding sleeve 26 from being moved away from the end 25b of the bar 25, and preventing hollow tube 22b from being telescopingly along the tube 25 so as to be moved off the flange 33a of laser beam bending block 32a (and thereby shortening the effective lenath of the tube arrangement 20, 22b) since the distance between bending block 32a and bending block 32b is fixed as a result of the overall system constraints, such as shown in FIG. 4.

As shown in FIG. 4, an arrangement according to one embodiment of the invention directs two separate laser beams from a laser source 100 to a multiplexer 200 that contains two rotating multi-faceted mirrors (not shown) for dividing the laser beams and scanning them across further downstream optics. As shown in FIG. 4, laser beams exiting the laser source 100 travel through the interiors of hollow tubes 22a, 22b, 22c, 22d, 22e, 22f, 22g, and 22h, and through pivoting target block assemblies 20 that are provided along the paths between each of the bending mirrors 32 to allow for alignment and maintenance of the mirrors.

In operation of the arrangement shown in FIG. 4, laser beam radiation exits the laser generating device 100 and enters a first hollow containment tube 22a, 22e until it reaches a first bending mirror block 32. As shown in the embodiment of FIG. 1, an arrangement for connecting the tubes 22a, 22e includes flange 10 on the laser beam source 100 and flange 33a on the first bending block 32a, which mate with opposite ends of the first hollow tube 22a. Tubes 22a, 22e can be held on the flange 10 by a locking arrangement such as a projection on flange 10 passing through a slot 22a' at one end of the hollow tube 22a and a retaining device such as a padlock 14 to retain the hollow tube 22a in position between the laser source 100 and the first bending mirror 34a.

The laser beam reflected from the first bending mirror 34a travels through the interior of hollow tube 22b and through the center longitudinal passageway 25" in bar 25 between the reflective surfaces of the mirrors 34a and 34b. One end of the hollow tube 22b is captured on the flange 33a of laser beam bending block 32a, and the opposite end of the hollow tube 22b fits telescopically over an end of the bar 25. A pushbutton release 27 is provided at the end 25a of bar 25 to retain the hollow tube 22b in position over the flange 33a of laser beam bending block 32a. Release of the pushbutton 27 allows the sleeve 22b to be slid telescopically over the outside surface of bar 25 and removed from engagement with the laser beam bending block 32a. However, as discussed above, a locking sleeve 72 can be positioned between the end of hollow tube 22b and outer sleeve 26 on the bar 25 to prevent movement of either the sleeve 26 or the hollow tube 22b.

In an initial alignment procedure, bending mirror 34a can be aligned with bending mirror 34b by first removing the locking sleeve 72 from between hollow tube 22b and outer sleeve 26 of the bar 25 in order to allow the sleeve 26 to be slid out of the way to provide access to the transverse passageway 25' through bar 25. Furthermore, removal of the locking sleeve 72 and release of pushbutton 27 allows the hollow tube 22b to be slid off of the flange 33a of laser beam bending block 32a, and the assembly 20 can then be pivoted about hinge mechanism 42, 44 to provide access to bending mirror 34b within the laser beam bending block 32b.

Although the arrangement according to an embodiment of the invention shown in FIG. 1 shows containment of the laser beam passing between bending mirrors 34a and 34b as achieved by a hollow tube 22b that fits telescopically over a bar 25, it will be recognized that other arrangements could include more than one hollow tube and/or bar that are adjustably positioned relative to each other and can be locked in place relative to each other using different mechanisms in order to control access to the path of the laser beam and the laser beam optics for alignment and/or maintenance. Other alternative embodiments could include the hollow containment tube portions fitting within openings in the laser beam bending blocks rather then over flanges that extend from the laser beam bending blocks.

Although the invention has been described with reference to the foregoing embodiments, it will be recognized that alternative arrangements and embodiments can be provided for controlling access to the laser beam and the laser beam optics without departing from the spirit and scope of the claims that are appended.

What is claimed is:

1. A laser beam containment system, comprising a laser-conducting structure for conducting a laser beam along a path from a laser beam source to a point of application of said laser beam, wherein the entire laser beam is encapsulated within said laser conducting structure along said path from said laser beam source to said point of application, said laser-conducting structure including at least two optics for directing said laser beam, and a tube arrangement interconnecting said at least two optics, said tube arrangement being movable out of said path for allowing access to at least one of said at least two optics without disturbing the distance relationship between said at least two optics, wherein said tube arrangement includes first and second telescoping tube portions, wherein telescoping movement between said first and second tube portions shortens an effective length of said tube arrangement to facilitate movement of said tube arrangement out of said path, wherein said at least two optics are mounted in respective blocks, said first telescoping tube portion being in telescopic relationship with a flange on one of said blocks, wherein said telescoping movement effects disengagement of said first tube portion from said flange.

2. The laser beam containment system of claim 1 further including an unlockable retainer lockable in a retaining position for preventing said telescoping movement.

3. A laser beam containment system according to claim 1 further including a padlock for locking said retainer in said retaining position.

4. A laser beam containment system of claim 2 wherein said retainer is positionable around the outside of one of said first and second tube portions and adjacent the other of said first and second tube portions for blocking said telescoping movement; and further comprising a separate padlock for holding said retainer in such movement-blocking position.

5. A laser beam containment system according to claim 1 said second tube portion is pivotably mounted to the other of said blocks to enable said tubular structure to be swung out of said path when said first tube portion has been disengaged from said flange of said one block.

6. A laser beam containment structure of claim 1 further comprising a separate lock for preventing movement of said tubular arrangement out of said path.

7. A laser beam containment system of claim 6 wherein said lock comprises a padlock.

8. A laser beam containment system, comprising a laser-conducting structure for conducting a laser beam along a path from a laser beam source to a point of application of said laser beam, wherein the entire laser beam is encapsulated within said laser conducting structure along said path from said laser beam source to said point of application, said laser-conducting structure including at least two optics for directing said laser beam, and a tube arrangement interconnecting said at least two optics, said tube arrangement being movable out of said path for allowing access to at least one of said at least two optics without disturbing the distance relationship between said at least two optics, wherein said tube arrangement includes first and second telescoping tube portions, wherein telescoping movement between said first and second tube portions shortens an effective length of said tube arrangement to facilitate movement of said tube arrangement out of said path, wherein one of said tube portions includes a transverse passageway providing access to said path; and further comprising a sleeve positionable around the exterior of said one tube portion and slidable relative thereto for uncovering said passageway.

9. A laser beam containment structure of claim 8 further comprising a retainer removably positionable between said sleeve and the other of said telescoping tube portions for preventing said sliding movement of said sleeve for uncovering said passageway.

10. A laser beam containment system according to claim 9, further comprising a separate padlock attachable to said retainer for preventing removal of said retainer.

* * * * *